United States Patent
Bourdin et al.

(10) Patent No.: US 8,464,892 B2
(45) Date of Patent: Jun. 18, 2013

(54) FOOD COOKING APPLIANCE HAVING A FERRITIC STAINLESS STEEL BOTTOM AND A FERRITIC OR AUSTENITIC STAINLESS STEEL BOWL

(75) Inventors: Alain Gilles Bourdin, Saint Seine sur Vinganne (FR); Florence Bourdin, legal representative, Saint Seine sur Vinganne (FR); Jean-Francois Marie Poty, Dijon (FR); Carole Audrey Alice Roche, Dijon (FR)

(73) Assignee: SEB. S.A., Ecully Cedex (FR)

( * ) Notice: Subject to any disclaimer, the term of this patent is extended or adjusted under 35 U.S.C. 154(b) by 568 days.

(21) Appl. No.: 12/489,203

(22) Filed: Jun. 22, 2009

(65) Prior Publication Data
US 2009/0321453 A1 Dec. 31, 2009

(30) Foreign Application Priority Data

Jun. 23, 2008 (FR) .................................. 08 03509

(51) Int. Cl.
*A47J 27/08* (2006.01)
(52) U.S. Cl.
USPC ....................................................... 220/573.3
(58) Field of Classification Search
USPC .................. 220/573.3, 573.1, 608, 626, 623, 220/912, FOR. 127, 600, 917; 219/624, 621, 219/620, 625; 99/403
IPC ............................................. A47J 27/08,36/02
See application file for complete search history.

(56) References Cited

U.S. PATENT DOCUMENTS

| | | | | |
|---|---|---|---|---|
| 2,099,622 A | * | 11/1937 | Printz | 335/219 |
| 4,048,934 A | * | 9/1977 | Wallace | 413/1 |
| 4,596,236 A | * | 6/1986 | Eide | 219/621 |
| 5,357,850 A | * | 10/1994 | Coudurier | 99/422 |
| 5,439,165 A | * | 8/1995 | Cartossi | 228/265 |
| 5,463,916 A | * | 11/1995 | Coudurier | 76/107.1 |
| 5,487,329 A | * | 1/1996 | Fissler | 99/403 |
| 5,532,461 A | | 7/1996 | Crummenauer et al. | |
| 5,564,590 A | * | 10/1996 | Kim | 220/626 |
| 6,422,233 B1 | * | 7/2002 | Bhagat | 126/390.1 |

(Continued)

FOREIGN PATENT DOCUMENTS

| | | |
|---|---|---|
| DE | 10120500 | 11/2002 |
| EP | 1053711 | 11/2000 |
| WO | 2005021179 | 3/2005 |

OTHER PUBLICATIONS

Search Report in related French Application No. 08/03509.

*Primary Examiner* — Robert J Hicks
(74) *Attorney, Agent, or Firm* — McClure, Qualey & Rodack, LLP (57) ABSTRACT

Food cooking appliance having a ferritic stainless steel bottom and a ferritic or austenitic stainless steel bowl intended to accommodate food and provided with a lower wall having an outer face; a ferritic stainless steel cup added on the outer face and fastened to the bowl, the cup forming a bottom (7) by which the cooking appliance is intended to rest on a cooking plate; patterns (8) engraved in the bottom (7); the appliance being characterized in that the engraving depth (P) of the patterns (8) and the density thereof on the bottom (7) are chosen so that the bottom (7) meets the requirements of the EN-12778 Standard of November 2002, and in that the stainless steel of the bowl is equally of ferritic or austenitic nature.

16 Claims, 3 Drawing Sheets

U.S. PATENT DOCUMENTS

| | | | |
|---|---|---|---|
| 6,702,140 B1 * | 3/2004 | Sollo | 220/573.3 |
| 2003/0047271 A1 * | 3/2003 | Wu et al. | 156/229 |
| 2005/0204928 A1 * | 9/2005 | Bourdin et al. | 99/403 |
| 2006/0102691 A1 * | 5/2006 | Toyama et al. | 228/101 |
| 2006/0196877 A1 * | 9/2006 | Droese | 220/573.3 |

* cited by examiner

FOOD COOKING APPLIANCE HAVING A FERRITIC STAINLESS STEEL BOTTOM AND A FERRITIC OR AUSTENITIC STAINLESS STEEL BOWL

CROSS-REFERENCE TO RELATED APPLICATION

This application claims priority to French Application Serial No. 08/03509, filed Jun. 23, 2008, of which are entirely incorporated herein by reference.

The present invention relates to the general technical field of household food heating and/or cooking appliances, such utensils being intended to cook and/or heat liquid or solid food substances.

More particularly, the present invention relates to a food cooking appliance comprising:
- an austenitic or ferritic stainless steel bowl intended to accommodate food and provided with a lower wall having an outer face,
- a ferritic stainless steel cup added on said outer face and fastened to said bowl, said cup forming a bottom by which said cooking appliance is intended to rest on a cooking plate,
- and patterns engraved in said bottom.

Food cooking appliances are known, which comprise a bowl intended to accommodate food so as to cook or heat it up, said bowl being intended to be subjected to the action of an external heat source, consisting typically of a cooking plate.

Taking into account the stresses, in particular thermal, mechanical and chemical (corrosion) stresses, to which the bowl is subjected, it is known to make the latter in stainless steel. In particular, it is known to use austenitic stainless steel for making the bowls, because this material has not only an excellent workability, in particular drawability, but also an attractive aesthetic appearance.

The use of austenitic stainless steel is especially appropriate for the manufacturing of pressure cookers, since the bowl of a pressure cooker is notably obtained by a delicate deep drawing process, which can be facilitated by the use of austenitic stainless steel.

However, the austenitic stainless steel does not allow the bowl to be used in conjunction with an induction heating plate, because the austenitic steel does not have the required ferromagnetic characteristics to allow such an induction heating. That is why it is known to add a ferritic stainless steel cup on the outer face of the bowl lower wall using a hot stamping process. The ferritic stainless steel has actually ferromagnetic characteristics that allow it to warm up when it is subjected to the magnetic field created by an induction cooking plate. Further, a layer of aluminum is interposed between the outer face of the bowl lower wall and the cup to improve the thermal transfer between the cup and the bowl. The thus-obtained bowl takes advantage from both the excellent aesthetic appearance and workability of the austenitic stainless steel and the ferromagnetic properties of the ferritic stainless steel enabling it to be used in conjunction with an induction cooking plate.

Although generally satisfactory, those known cooking appliances however pose a number of technical, economical and industrial problems.

Indeed, the austenitic stainless steel contains a great quantity of nickel. Now, the nickel market suffers from tensions that lead to substantial cost changes of this raw material as a function of the international demand. In particular, the cost of nickel may sufficiently increase to cause a significant rise of the pressure-cooker-bowl cost price. Therefore, it is relatively cost-ineffective to manufacture austenitic stainless steel bowls when the nickel price is high, which, incidentally, is more and more often the case.

Moreover, ferritic stainless steel and austenitic stainless steel have different thermomechanical behaviors. This can result, when the cooking appliance is subjected to the heat of a heat source, in deformations of the unit comprised of the bowl and the cup that are functionally unacceptable. In order to minimize those undesirable effects mainly due to the expansion of the cup, it is known to make holes throughout the thickness of the latter. However, the presence of these holes places the intermediate layer of aluminum positioned between the cup and the outer face of the bowl lower wall in communication with the outside, which may lead to a progressive erosion of the aluminum thus exposed, in particular if the pressure cooker is often washed in a dishwasher (actually, the detergent used in a dishwasher are generally extremely aggressive to aluminum).

Finally, the use of an austenitic steel bowl and a ferritic steel cup creates manufacturing problems. Indeed, such a bowl/cup subset is generally made using a hot stamping process to add the ferritic stainless steel cup on the lower-wall outer face of the austenitic stainless steel bowl.

This hot stamping process creates an intimate (atomic) bond between the bowl and the cup at the periphery of the latter, with a layer of aluminum interposed between the bowl and the cup. Now, after the hot stamping process is completed, it is generally observed that the bottom of the thus-obtained vessel presents an outward bulging, i.e. the cup has a convex shape. Such a convex shape is of course absolutely unacceptable because it would prevent the vessel to rest stably on the plane support. This problem of convex bulging of the cup results a priori from a mechanical interaction between the austenitic steel of the bowl and the ferritic steel of the cup, the latter locally applying a "traction stress" on the austenitic steel of the bowl and the austenitic steel of the bowl being not capable of counterbalancing such traction stress, which leads to said convex bulging. This phenomenon is minimized by making holes through the cup, but it does not disappear and necessitates to be corrected by an additional reshaping process.

To overcome this manufacturing problem, as well as the economic problem linked to nickel cost variations, it could be conceivable to make the bowl in ferritic steel (which does not contain nickel), like the cup. If such a technical measure is liable to solve the economical problem ensuing from the nickel cost variations, it however does not solve satisfactorily the manufacturing problem. Indeed, because of the thermo-mechanical stresses to which it is intended to be subjected, the bowl has a relatively great thickness, but such a thickness is not needed for the cup. Because of this thickness difference between the cup and the bowl, a deep concave bulging of the cup toward the bowl inside occurs at the end of the hot stamping process for assembling the cup to the bowl.

This concavity is too much pronounced to be acceptable, because it would harm the quality of energy transfer between the cooking plate and the vessel. This concave bulging phenomenon probably comes from the fact that the greatest thickness of ferritic steel (corresponding to the bowl) applies a "traction stress" on the lesser thickness of ferritic steel (corresponding to the cup). Making holes through the cup is of no help in this case, and, on the contrary, it contributes to accentuate this concave bulging phenomenon. A possible option to solve this problem could be to implement a ferritic steel cup having a greater thickness, and for example substantially equivalent to or even greater than the thickness of the bowl. Such a measure would however go against the desired economic goal.

Consequently, the objects assigned to the invention are to remedy the various above-mentioned drawbacks and to provide a novel food cooking appliance which is particularly robust and whose manufacturing is cost-effective whatever the nickel price and is industrially optimized, i.e. it takes advantage of the materials that have the best quality/price ratio at the considered time, while needing only a minimum of different tools and processes.

Another object of the invention is to provide a novel food cooking appliance which is particularly cost-effective when the nickel price is high.

Another object of the invention is to provide a novel food cooking appliance whose manufacturing is facilitated and which has an acceptable cost price when the nickel price is low.

Another object of the invention is to provide a novel food cooking appliance whose manufacturing is based upon conventional and well-mastered processes.

Another object of the invention is to provide a novel food cooking appliance whose design allows an excellent transmission of heat to the food it is intended to contain.

Another object of the invention is to provide a novel food cooking appliance which has an excellent size stability in any circumstances.

Another object of the invention is to provide a novel food cooking appliance having a particularly simple design and whose manufacturing does not need long, complicated and costly processes.

Another object of the invention is to provide a novel food cooking appliance having a particularly attractive aesthetic appearance.

The objects assigned to the invention are achieved with the help of a food cooking appliance comprising:
- an austenitic or ferritic stainless steel bowl intended to accommodate food and provided with a lower wall having an outer face,
- a ferritic stainless steel cup added on said outer face and fastened to said bowl, said cup forming a bottom by which said cooking appliance is intended to rest on a cooking plate,
- patterns engraved in said bottom,
- said appliance being characterized in that the engraving depth of said patterns and the density thereof on the bottom are chosen so that said bottom meets the requirements of the EN-12778 Standard of November 2002, and in that the stainless steel of the bowl is equally of ferritic or austenitic nature.

Other features and advantages of the invention will appear in greater detail from the following description, with reference to the appended drawings given only by way of illustrative and non-limiting example, and in which:

FIGS. 1 to 3 are schematic vertical cross-sectional views illustrating the chronological steps of the method of manufacturing a cooking appliance according to the invention, wherein FIG. 3 illustrates a food cooking appliance according to the invention;

Figure 1:
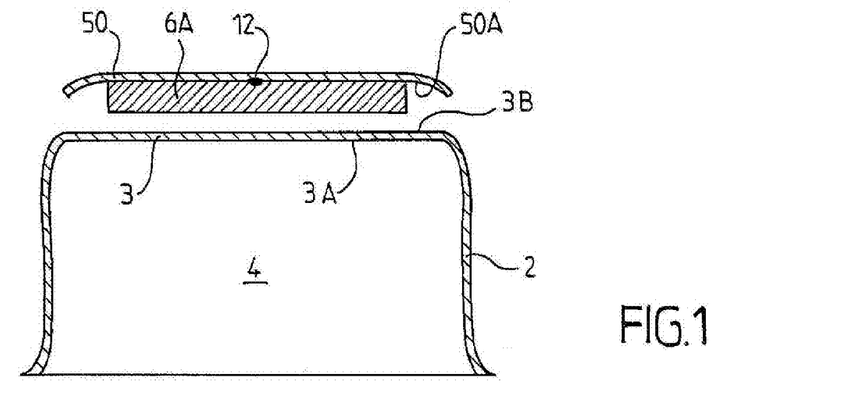
Figure 2:
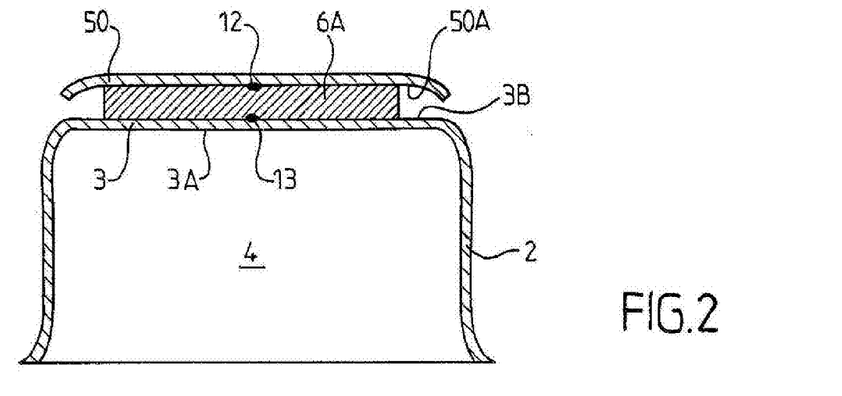
Figure 3:
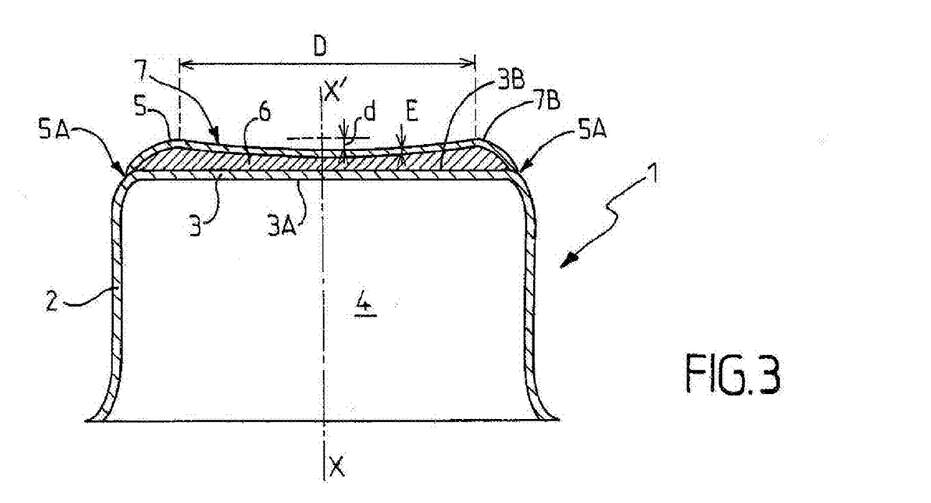

FIGS. 1 to 3 schematically illustrate various steps of manufacturing of the vessel of a cooking appliance 1 according to the invention, wherein FIG. 3 shows said vessel once the manufacturing is completed (said vessel being shown upside down in FIG. 3).

As can be seen in FIG. 3, the food cooking appliance 1 comprises a bowl 2 intended to accommodate food and provided for that purpose with a lower wall 3, having preferably a substantially discoid or oval shape, with an inner face 3A facing the inside 4 of the bowl and an opposite outer face 3B. The bowl 2 also comprises an annular side wall rising up from said bottom wall, at the periphery of the latter. As well known as such, the bowl 2 has advantageously a rotational symmetry about an axis X-X'. The bowl 2 is made of stainless steel so as to be able to withstand the different thermomechanical and chemical (corrosion) stresses to which it is intended to be subjected, and more precisely it is made of austenitic or ferritic stainless steel.

The cooking appliance 1 according to the invention is a thermally passive device, i.e. it does not comprise any internal heat source and it has to be subjected to the action of an external heat source to heat and cook the food.

Preferably, the food cooking appliance 1 is a pressure cooker, i.e. an appliance for cooking food under pressure. In this case, the bowl 2 is intended to be closed by a lid (not shown) connected to the bowl 2 by a user-operable locking/unlocking system. As well known, the lid is also advantageously provided with a pressure release valve allowing the pressure in the inside 4 of the bowl 2 to be kept at a predetermined value, for example a pressure at least 20 kPa higher than the atmospheric pressure. The bowl 2, when forming a pressure cooker bowl, is preferably obtained by a process of drawing a sheet metal blank, which provides a relatively deep bowl having walls sufficiently thick to withstand high pressures. Of course, the choice to make the bowl 2 in stainless steel is perfectly appropriate for a pressure cooker because the stainless steel has notably an excellent resistance to corrosion, but also an excellent mechanical strength, which allow the bowl 2 to withstand high internal pressures.

However, the invention is not limited to a cooking appliance 1 consisting of a pressure cooker and can alternatively consist of one of the utensils of the following group: saucepan, frying pan, cooking pot or kettle, this list being of course not limitative.

According to the invention, the food cooking appliance 1 comprises a cup 5 added on the outer face 3B of the lower wall 3 and fastened to said bowl 2. The cup 5 has preferably a shape of revolution around a symmetry axis X-X', which is the same as that of the bowl 2. The cup 5 advantageously comprises a substantially discoid central part, at the periphery of which rises up an annular side wall that extends between a lower edge, fastened to the discoid part, and a free annular upper edge 5A that comes against the bowl 2.

According to the invention, the cup 5 is made of ferritic stainless steel so as to make the food cooking appliance 1 compatible with induction heating.

Advantageously, the cooking appliance 1 further comprises an intermediate layer 6, the thermal conductibility of which is higher than that of the steel, and in particular that of the ferritic steel forming the cup 5, said intermediate layer 6 being interposed between the outer face 3B of the lower wall 3 and the cup 5. As well known, the intermediate layer 6 is preferably made of aluminum, such material being known to have excellent thermal conductibility properties. As illustrated in FIG. 3, the cup 5 preferably embraces almost fully the intermediate layer 6, with its free edge fitting (and possibly interpenetrating) the periphery of the outer face 3B of the lower wall 3 at the peripheral line corresponding to the free edge 5A of the cup 5.

In this way, the intermediate layer 6 is substantially isolated from the outside because it is interposed between the cup 5 and the lower wall 3, in a closed, or even sealed chamber (circumscribed by the cup 5 and the outer face 3B), almost the full volume of which it preferably occupies.

Advantageously, the cup 5 is fastened to the bowl 2 by a stamping process, preferably a hot stamping process. Hot stamping is a technique that is well known to a person skilled in the art. It consists in performing by means of a press a fast compression, comparable to an impact, this process being performed in a hot state so as to make the metal more malleable. Advantageously, the intermediate layer 6 is also attached to the outer face 3B of the lower wall 3 by a hot stamping process. Preferably, the method of manufacturing implements a single hot stamping process allowing to simultaneously add on and attach to the outer face 3B of the lower wall 3 both the intermediate layer 6 and the cup 5 at once.

The manufacturing steps are preferentially as follows:

- an aluminum blank 6A is placed against the inner face 50A of a ferritic stainless steel blank 50 intended to form the cup 5, said aluminum blank 6A being attached to said inner face 50A by a welding point 12, as illustrated in FIG. 1;
- the subset formed by the aluminum 6A and the ferritic stainless steel 50 blanks associated together is added on and fastened to the outer face 3B of the lower wall 3 by a welding point 13, so that the aluminum blank 6A is interposed between the outer face 3B and the ferritic stainless steel blank 50, as illustrated in FIG. 2;
- this stack is then subjected to a hot stamping process which creates an intimate and uniform bond of the outer face 3B, the intermediate layer 6 and the cup 5 over all their respective surfaces, the cup 5 being bonded to the bowl 2 by the intermediate layer 6. However, it is perfectly conceivable, as a complement and/or as an alternative, to bond the cup 5 directly to the bowl 2, for example by performing the hot stamping process so that the cup 5 is directly and intimately bonded to the bowl 2 at the free upper edge 5A thereof.

It results a vessel comprised of the bowl 2, the cup 5 and the intermediate layer 6 assembled together.

The cup 5 forms a bottom 7 by which the cooking appliance 1 is intended to rest stably on a cooking plate or any other substantially plane support (table, shelf or the like). The cup 5 thus forms a base for the bowl 2 to which it is fastened, said base having the two functions of serving as a resting interface for the bowl 2, on the one hand, and of transmitting the thermal energy to the content of the bowl 2, on the other hand.

As well known, the bottom 7 has a sufficiently small curvature to both form a stable supporting surface for the appliance 1 and provide a sufficient energy transfer between the cooking plate and the appliance 1. Of course, said curvature of the bottom 7 formed by the cup 5 can only be a concave curvature directed toward the inside 4 of the bowl 2, insofar as a convex curvature would necessarily prevent the vessel formed by the bowl 2 and the cup 5 assembled together to rest stably on a plane support.

The concavity degree of the bottom 7 is conventionally chosen as follows:

- it must be sufficiently small so that the maximal distance d between the cooking plate and the bottom 7, generally known as "central bottom deflection", does not harm drastically the energy output of the cooking appliance 1, i.e. does not excessively hamper the energy transfer between the cooking plate and the cup 5.
- this concave curvature has however to be sufficiently pronounced to compensate a potential convex deformation which may be generated by the heating of the appliance; in other words, the purpose of a slight concave curvature is to avoid, whatever the thermomechanical stresses to which is submitted the vessel formed by the bowl 2 and the cup 5, that the cup 5 becomes convex and leads to an unstable resting of the appliance 1 on the cooking plate.

The EN12778 European Standard of November 2002 specifies limit value ranges in which the deflection d has to be comprised as a function of the thermomechanical conditions to which is subjected the vessel formed by the bowl 2/cup 5 unit.

In particular, this standard specifies the following conditions:

(i) The deflection d, for an appliance 1 coming from factory and not in using conditions (i.e. at ambient temperature), must be comprised between 0 (which corresponds to a plane bottom 7; a negative value of the deflection d would correspond to a convex bottom 7, which would be unacceptable) and 0.006×D, wherein D is the diameter of the resting ring 7B of the bottom 7, i.e. the diameter of the contact interface between a horizontal plane support and the bottom 7 resting on said support.

(ii) The deflection d, for an appliance 1 whose bottom 7 is subjected to a temperature of 220° C., must be greater than 0 (i.e. the bottom 7 must not be convex).

(iii) The deflection d, for an appliance 1 that is not in using conditions (i.e. at ambient temperature) and that has undergone 25 thermal shocks, must be comprised between 0 and 0.006×D.

(iv) The deflection d, for an appliance 1 that has undergone 25 thermal shocks and whose bottom 7 is subjected to a temperature of 220° C., must be greater than 0 (i.e. the bottom 7 must not be convex).

The appliance 1 according to the invention meets the requirements of this EN12778 European Standard of November 2002.

According to the invention, the appliance 1 also comprises patterns 8 engraved in the bottom 7 formed by the cup 5. As used herein, "engraved" means that said patterns 8 are marked out in the metallic bottom 7. Thus, the patterns 8 are not obtained by removal of material from the bottom 7, but by hollow deformation of said material. This means in particular that the patterns 8 are not formed by holes extending through the whole thickness of said bottom 7. The patterns 8 thus form a blind indentation in the surface of said bottom 7. In other words, the patterns 8 do not extend through the whole thickness of the bottom 7, and thus of the cup 5. Therefore, the patterns 8 do not extend throughout the bottom 7, from one side to the other. The fact that the patterns 8 are engraved and not cut into the bottom 7 notably allow the intermediate aluminum layer 6 to be fully isolated from the external environment, which allows it to be preserved from potential corrosive attacks, generated for example by washing in a dishwasher.

According to the invention, the engraving depth P of said patterns 8 (i.e. the depth of the hollows forming said patterns 8 in the surface of the cup 5) and the density of said patterns 8 on the bottom 7 (i.e. the ratio between the engraved surface area and the total surface area of the bottom 7) are chosen so that the bottom 7 meets the requirements of the EN-12778 Standard of November 2002 (notably the above-mentioned requirements (i) to (iv)), and the stainless steel of the bowl 2 is equally of ferritic or austenitic nature.

Therefore, the invention lies in particular on the identification of primary parameters allowing the cup 5 to be equally associated, preferably by a hot stamping process, to either a ferritic or an austenitic stainless steel bowl 2, to obtain a vessel that meets the usual manufacturing and using requirements and thus the requirements of the EN-12778 Standard of November 2002.

Such primary parameters are thus the following ones:
engraving depth P of said patterns 8, and
density of said patterns 8 engraved in the bottom 7.

Therefore, the invention has allowed to establish that, by simply adjusting the depth P and the density of the patterns engraved in the cup 5, it is possible to associate a single thus-engraved cup 5 either to an austenitic stainless steel bowl 2 (preferably of the grade AISI 304) or to a ferritic stainless steel bowl 2 (preferably of the grade AISI 436 or AISI 444) and to obtain in each case an excellent result, i.e. a vessel (formed by the bowl 2 and the cup 5 assembled together) which satisfies all the criteria that are used to measure the performance of the cooking utensil bottoms, and at least the normative criteria.

These criteria, some of which correspond to requirements of the EN-12778 Standard of November 2002, are notably the following ones, ranked in a decreasing order of importance:
stability of the central bottom deflection (materialized by the distance d in FIG. 3) after 25 thermal shocks,
stability of the central bottom deflection d after test pressurization,
stability of the central bottom deflection after cooking durability,
stability of the resting diameter D and of the bottom deflection d after dry heating,
warm-up time on an induction plate,
power absorbed on an induction plate,
output on a vitro-ceramic plate (halogen or radiant),
output on a cast iron plate (electric),
resistance to washing in a dishwasher.

Therefore, the invention has allowed to determine that the simple adjustment of the engraving depth and the density of the patterns engraved in the bottom 7 can provide a cup 5 that can be used both with a ferritic stainless steel bowl and an austenitic stainless steel bowl. In other words, the invention has thus allowed to identify the parameters that permit to obtain a technical compromise liable to give the user the choice of material for making the bowl 2.

Therefore, when the nickel price is low, and thus when the austenitic stainless steel price is economically acceptable, the appliance 1 is advantageously made by associating a ferritic stainless steel cup 5 engraved according to the teachings of the invention with an austenitic stainless steel bowl 2.

In case the nickel price would increase, making the use of austenitic stainless steel inappropriate, the production could be immediately continued with a ferritic stainless steel bowl 2 (or at least a stainless steel having nickel content lower than that of the austenitic steel) associated with the same cup 5, inasmuch as the engraving depth of the patterns 8 and the density of said patterns 8 on the bottom 7 formed by the cup 5 will have been chosen beforehand so that said cup 5 suits both an austenitic stainless steel bowl and a bowl made of a stainless steel having a lesser or even null nickel content, as is the case for the ferritic stainless steel. Thus, the food cooking appliance may advantageously comprise either a bowl 2 made of a steel of ferritic nature or a bowl 2 made of a steel of austenitic nature.

Preferably, the density of the patterns 8 engraved in the bottom 7 is comprised between substantially 10 and 60%, and more preferably between 10 and 30%. The applicant has in particular highlighted that a density of approximately 20% would provide excellent results, it being understood that the ranges 10-20% on the one hand and 20-60% on the other hand would also give satisfying results.

Within the meaning of the invention, the pattern density is obtained by the following formula:

$$\text{Density}_{patterns} = S_{engraved}/S_{not\_engraved}$$

where $\text{Density}_{patterns}$ is the density (in %) of patterns 8 as understood within the meaning of the invention, $S_{engraved}$ is the surface (expressed, for example, in mm$^2$) of the bottom 7 that is effectively occupied by the engraved patterns, and $S_{not\_engraved}$ is the total useful surface (expressed in the same unit as $S_{engraved}$) of the bottom 7, i.e. the surface area of the region circumscribed by the rest ring 7B (in the examples illustrated in the figures, $S_{not\_engraved}$ thus substantially corresponds to the surface area of the discoid region of diameter D).

Advantageously, the engraving depth P of said patterns 8 is comprised, notably as a function of the thickness of the intermediate layer 6, between substantially 1.5%×E and 90%×E, more preferably between 15%×E and 50%×E, where E is the thickness value of the cup 5. The applicant has in particular highlighted that an engraving depth substantially greater than 90%×E does generally not provide satisfying results, because it is liable to entail a too great weakening of the metal forming the bottom 7. On the contrary, an engraving depth substantially equal to E/3 (33.3%×E) gives excellent results.

Advantageously, the thickness E of the cup is substantially greater than or equal to 0.6 mm, this value being the minimum value providing compatibility with induction. In other words, if the thickness value E is lower than 0.6 mm, then there exists a risk that the inductive effect is not sufficient for allowing the cooking in acceptable conditions for the user.

For the sake of economy of raw material, the thickness E is preferably substantially equal to 0.6 mm. In this case, the applicant has highlighted that a depth P comprised between 0.01 mm and 0.54 mm, and more preferably between 0.1 and 0.3 mm, provides good results. The applicant has in particular highlighted that an engraving depth substantially greater than 0.54 mm does generally not provide satisfying results, because it is liable to entail a too great weakening of the metal forming the bottom 7. On the contrary, an engraving depth substantially equal to 0.2 mm gives excellent results, it being understood that a depth P comprised between substantially 0.3 mm and 0.5 mm, or even, more precisely, between substantially 0.3 and 0.4 mm or between substantially 0.4 and 0.5 mm also provides satisfying results, notably as a function of the thickness of the intermediate layer 6.

Advantageously, the patterns 8 are substantially regularly distributed over the bottom 7, and more preferably said patterns 8 extend substantially regularly over most of the surface of the bottom 7, or even over the totality of said surface, except preferably for:
a central area 7A, preferably substantially circular, reserved to the marking of the product (brand name or other commercial or technical information, or the like).
and a peripheral ring 7B, preferably substantially circular of diameter D, which forms the resting surface itself of the bottom 7, i.e. the bottom 7, when it is laid on a plane support, rests on said support by a surface in the form of a circular plane ring formed by the peripheral ring 7B. The absence of patterns in the resting ring 7B allows to prevent the structure of the material to be affected, which could entail unacceptable size variations at this place, which corresponds to the resting area of the appliance and which must therefore be perfectly and durably plane, in any circumstances.

Advantageously, the patterns 8 predominantly consist of engraved lines. This means that said patterns 8 are made with hollow lines and not with hollow surfaces, although this latter possibility is not excluded.

Preferably, the patterns 8 are arranged over the bottom 7 so as to form a whole resulting pattern having a symmetry about the axis X-X', which provides an homogeneous and uniform mechanical behavior to the cup 5.

Figure 5:
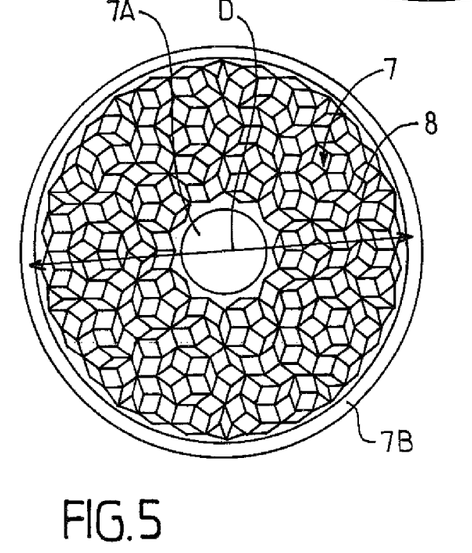
FIG. 5 is a bottom view illustrating a second embodiment of a food cooking appliance according to the invention.
Figure 6:
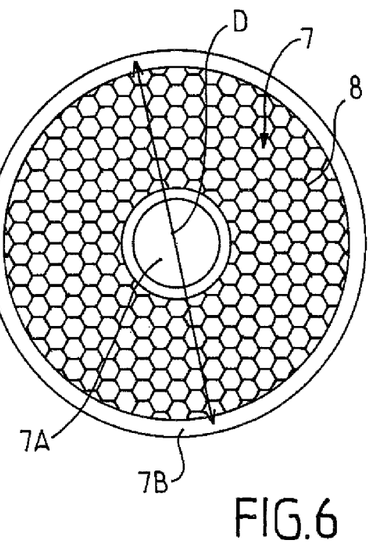
FIG. 6 is a bottom view illustrating a third embodiment of a cooking appliance according to the invention.

The following Table 1 sums up, for each of the examples corresponding to FIGS. 5 and 6 respectively, the value given to some of the above-discussed parameters and the obtained results.

Figure 4:
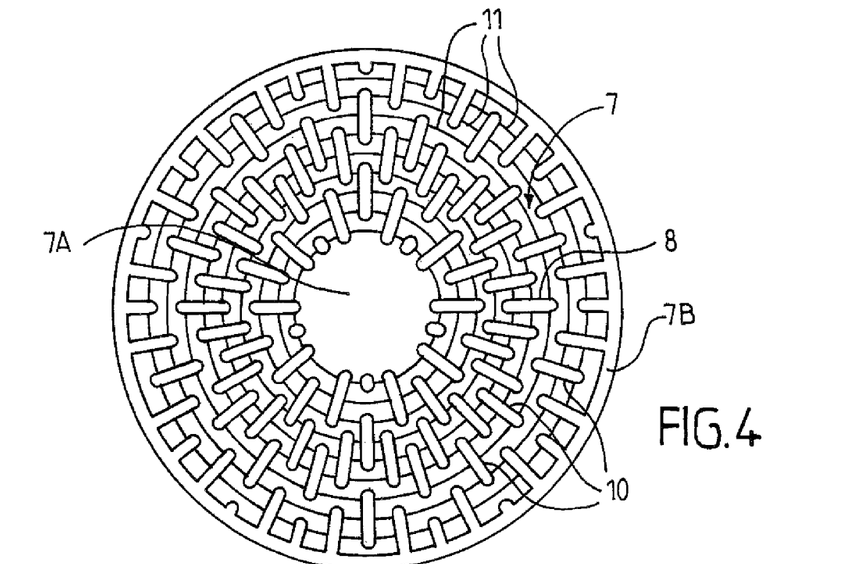
FIG. 4 is a bottom view illustrating a first embodiment of a food cooking appliance according to the invention.

It is to be noticed that, if FIGS. 4 to 6 are not to scale 1:1, they however respect the proportions and correspond, modulo a homothetic factor, to the real geometry which is subjected to the tests shown in Table 1.

TABLE 1

|   | Shape of the patterns | Resting diameter D | Engraving depth P | Density of patterns | Width L of the engraving line | Compatibility with an austenitic steel bowl (AISI 304) | Compatibility with a ferritic steel bowl (AISI 436) |
|---|---|---|---|---|---|---|---|
| I | FIG. 5 | 180 mm | 0.2 mm | 20.5% | 1 mm | yes | yes |
| II | FIG. 5 | 180 mm | 0.5 mm | 20.5% | 1 mm | yes | no (too deep) |
| III | FIG. 5 | 200 mm | 0.5 mm | 21.3% | 1 mm | yes | no (too deep) |
| IV | FIG. 5 | 200 mm | 0.2 mm | 21.3% | 1 mm | yes | yes |
| V | FIG. 6 | 180 mm | 0.55 mm | 22.3% | 1 mm | Yes | no (too deep) |

Figure 7:
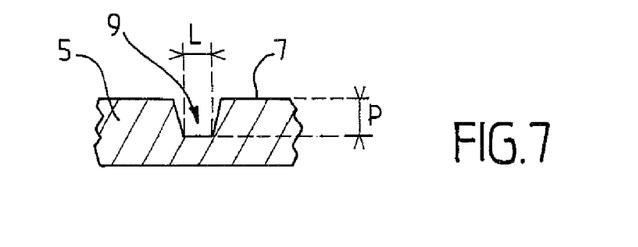
FIG. 7 is a cross-sectional view illustrating an embodiment detail of a cooking appliance according to the invention, that shows the geometry of the patterns engraving line.
Figure 8:
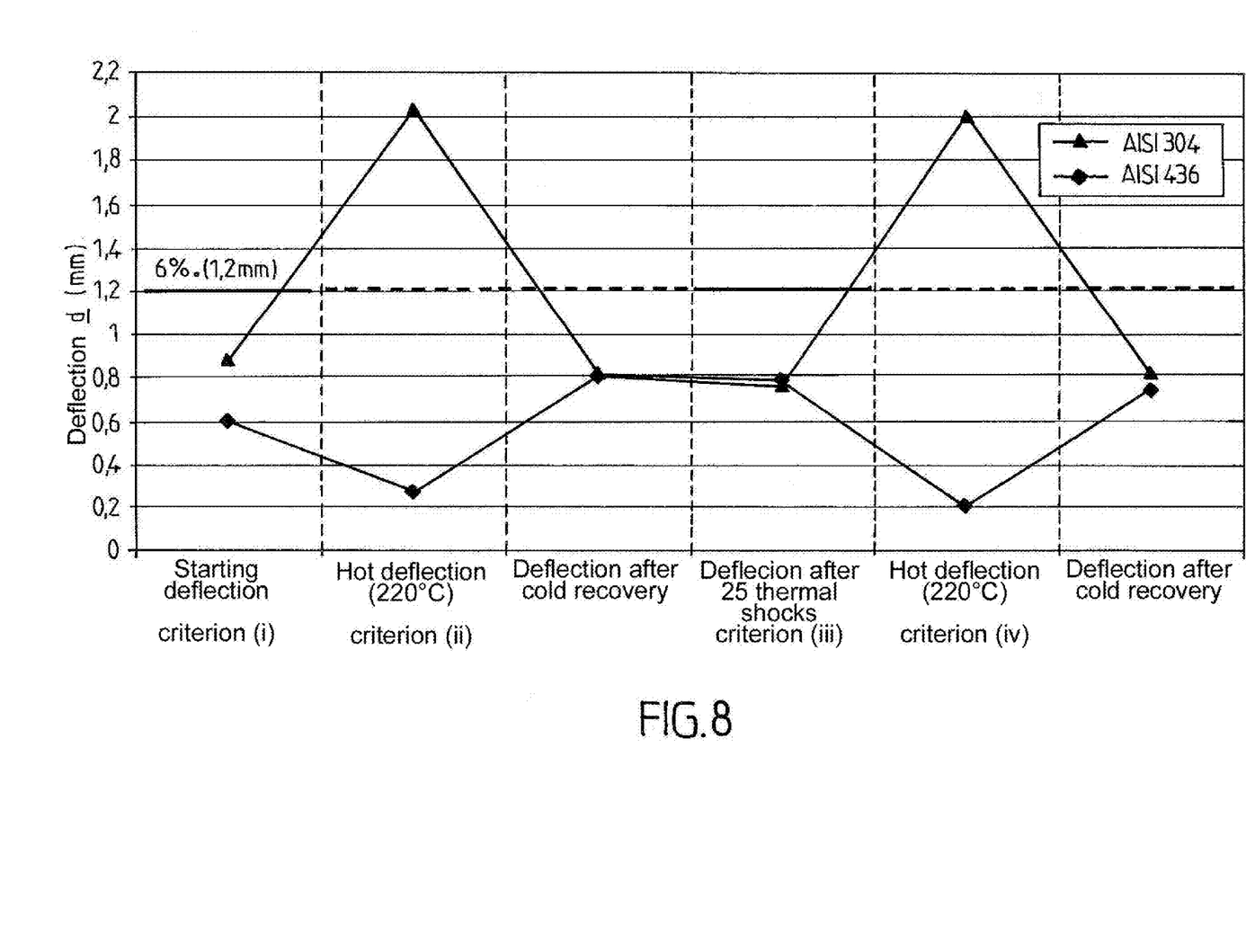
FIG. 8 is a graph showing the evolution of the deflection d of the bottom of an appliance according to FIG. 5, as a function of various stresses, some of which (criteria (i) to (iv)) correspond to requirements of the EN12778 Standard of November 2002.

Besides, it has been established that some secondary parameters can act in obtaining a satisfying result, in addition to the above-mentioned primary parameters (density and engraving depth). These secondary parameters notably comprise:
  thickness of the intermediate layer 6, which can play a role for obtaining the final result; and
  geometry of the engraving line 9 which forms the patterns 8 preferably, the shape of the engraving line 9 must not have, in cross-section, a profile forming an acute angle (V-profile) but rather, as illustrated in FIG. 7, a flat-bottomed profile (truncated V-profile or trapezoid profile); preferably, the width L of the engraving line 9 is comprised, at the line bottom, between substantially 0.1 and 3 mm, and preferably between 0.8 and 1.2 mm. A width L of about 1 mm at the engraving line bottom gives excellent results, in particular in conjunction with a density of about 20% and an engraving depth P of about 0.2 mm.

Of course, there exists for the patterns 8 an infinity of shapes allowing to obtain the desired results.

Preferably, the patterns 8 have a repetitive character, so as to form a pavement, as illustrated in FIGS. 4 to 6.

For example, as illustrated in FIG. 5, said pavement can be a pavement of the Penrose type. The aperiodic character of such a pavement further allows to take advantage from interesting mechanical properties, in particular regarding the distribution of rigidity over the resting face 7.

Alternatively, the pavement can be a honeycomb pavement, as illustrated in FIG. 6, i.e. a pavement formed of a plurality of adjacent hexagonal cells.

According to another embodiment, which is particularly preferred, said patterns 8 comprise a plurality of oblong annular shapes 10 oriented radially with respect to the center of the cup 5 (center by which passes the axis X-X'). In this embodiment illustrated in FIG. 4, said patterns 8 further comprise a plurality of concentric circles 11, the center of which correspond to that of the cup 5, i.e. to the center of the bottom 7 formed by the cup 5.

FIG. 7 graphically illustrates the results of the tests performed on a clamp pressure cooker according to the example IV of the above Table 1, some of these tests aiming at establishing the conformity with some of the above-mentioned criteria (i) to (iv) of the EN-12778 Standard of November 2002.

Preferably, the patterns 8 are engraved simultaneously by a stamping process, and preferably a hot stamping process. Particularly advantageously, the hot stamping process is the same as that which assembles together the cup 5, the intermediate layer 6 and the bowl 2.

A relief drawing corresponding to the patterns has just to be provided on the surface of the press tool die used for the stamping process.

The invention claimed is:

1. Food cooking appliance (1) comprising:
  an austenitic or ferritic stainless steel bowl (2) intended to accommodate food and provided with a lower wall (3) having an outer face (3B),
  a ferritic stainless steel cup (5) added on said outer face (3B) and fastened to said bowl (2), said cup (5) forming a bottom (7) by which said cooking appliance (1) is intended to rest on a cooking plate,
  patterns (8) engraved in said bottom (7) and having a depth (P) and a density,
  said appliance (1) being characterized in that the engraving depth (P) of said patterns (8) and the density thereof on the bottom (7) are chosen so that said bottom (7) meets the requirements of the EN-12778 Standard of November 2002 regardless of whether the stainless steel of the bowl be of ferritic or austenitic nature and said engraving depth (P) is between substantially 1.5% and 90% of the thickness of the cup (5), thereby preventing corrosion of said bowl.

2. Appliance (1) according to claim 1, in which said cup (5) is fastened to the bowl (2) by a stamping process.

3. Appliance (1) according to claim 1 and including an intermediate layer (6), with a thermal conductibility that is higher than that of the steel used for the bowl and cup, said intermediate layer (6) being interposed between the outer face (3A) of the lower wall (3) and the cup (5).

4. Appliance (1) according to claim 1 in which said patterns (8) have a repetitive character, so as to form a pavement.

5. Appliance (1) according to claim 4, in which said pavement is a Penrose pavement.

6. Appliance (1) according to claim 4, characterized in that said pavement is a honeycomb pavement.

7. Appliance (1) according to claim 1 in which said patterns (8) predominantly consist of engraved lines.

8. Appliance (1) according to claim 1 in which said patterns (8) comprise a plurality of oblong annular shapes (10) oriented radially with respect to a center of the cup (5).

9. Appliance (1) according to claim 1 in which said patterns (8) comprise a plurality of concentric circles (11), a center of which corresponds to that of the bottom (7) formed by the cup (5).

10. Appliance (1) according to claim 1 in which the density of the patterns (8) engraved in the bottom (7) is comprised between substantially 10% and 60%.

11. Appliance (1) according to claim 1 in which the engraving depth (P) of said patterns (8) is between 15% and 50% of the thickness of the cup (5).

12. Appliance (1) according to claim 1 in which said patterns have engraving lines having width (L) and a bottom, and the width (L) of the engraving line is comprised, at the line bottom, between substantially 0.1 and 3 mm.

13. Appliance (1) according to claim 12 in which said density is of about 20%, said width (L) at the line bottom is of about 1 mm, and the engraving depth (P) is of about 0.2 mm.

14. Appliance (1) according to claim 1 in which said patterns (8) are substantially regularly distributed over most of a surface of the bottom (7).

15. Appliance (1) according to claim 1 in which said appliance is a pressure cooker.

16. Appliance (1) according to claim 1 in which said patterns have engraving lines having width (L) and a bottom, and the width of the engraving line is comprised, at the line bottom between substantially 0.8 and 1.2 mm.

\* \* \* \* \*